United States Patent
Nevin et al.

(10) Patent No.: US 8,620,597 B2
(45) Date of Patent: Dec. 31, 2013

(54) PARTICULATE FILTER SERVICE LIFE PREDICTION

(75) Inventors: Ryan Nevin, Waterloo, IA (US); Antonio Triana, Waterloo, IA (US); Danan Dou, Cedar Falls, IA (US); Taner Tuken, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 355 days.

(21) Appl. No.: 12/896,133

(22) Filed: Oct. 1, 2010

(65) Prior Publication Data
US 2012/0084018 A1    Apr. 5, 2012

(51) Int. Cl.
*G01N 11/04* (2006.01)
*G01N 9/26* (2006.01)
*G01F 3/00* (2006.01)
*G01F 3/02* (2006.01)

(52) U.S. Cl.
USPC ............ 702/34; 702/24; 702/182; 702/183

(58) Field of Classification Search
USPC ......... 702/24, 34, 53, 66, 182, 183, 189, 193, 702/194; 184/108; 210/739
See application file for complete search history.

(56) References Cited

U.S. PATENT DOCUMENTS

| | | | |
|---|---|---|---|
| 5,858,044 A * | 1/1999 | Nepsund et al. ............ 55/486 |
| 5,968,371 A * | 10/1999 | Verdegan et al. .......... 210/739 |
| 6,193,883 B1 * | 2/2001 | Kroner et al. ............ 210/198.2 |
| 6,334,950 B1 * | 1/2002 | Bogacki et al. ............ 210/97 |
| 6,622,480 B2 | 9/2003 | Tashiro et al. |
| 6,928,809 B2 | 8/2005 | Inoue et al. |
| 7,157,919 B1 | 1/2007 | Walton |
| 7,243,489 B2 | 7/2007 | Johnson et al. |
| 7,552,799 B2 * | 6/2009 | Sherrington ............ 184/7.4 |
| 8,214,135 B2 * | 7/2012 | Nevin et al. ............ 701/114 |
| 2005/0150214 A1 | 7/2005 | Crawley et al. |
| 2007/0006577 A1 | 1/2007 | Yokoyama et al. |
| 2007/0056270 A1 | 3/2007 | Liimatta et al. |
| 2007/0056272 A1 | 3/2007 | Dollmeyer et al. |
| 2007/0209333 A1 | 9/2007 | Kondou |
| 2007/0251214 A1 | 11/2007 | Nishino et al. |
| 2010/0126145 A1 | 5/2010 | He et al. |

OTHER PUBLICATIONS

European Search Report dated Sep. 25, 2012 for related European Application No. 11183346.

* cited by examiner

*Primary Examiner* — Sujoy Kundu
*Assistant Examiner* — Felix Suarez
(74) *Attorney, Agent, or Firm* — Quarles & Brady LLP

(57) ABSTRACT

A method for determining the service interval of a particulate filter including the steps of determining a normalized current pressure differential across the particulate filter and determining a normalized pressure differential across the particulate filter for clean conditions. The clean pressure normalized pressure differential is subtracted from the current differential and divided by the time between regeneration to determine a current factor. A maximum factor is predetermined and compared to the current factor to determine service life for the particulate filter.

7 Claims, 3 Drawing Sheets

PARTICULATE FILTER SERVICE LIFE PREDICTION

FIELD OF THE INVENTION

The present invention relates to internal combustion engines and, more particularly, to the prediction of service life of a particulate filter used with engines of this type.

BACKGROUND OF THE INVENTION

For the last several decades, there have been increasingly stringent emission standards applied to internal combustion engines of all types. Concurrent with the move towards stricter limits on emissions was the adoption of particulate filters. Such adoption was first made in the field of compression ignition, or diesel, engines operating under such load and rpm conditions that soot is generated in the exhaust and is required to be filtered. With advances in the fuel efficiency for other types of engines, for example, spark ignition engines with direct fuel injection, the need for a particulate filter may also be indicated.

Whatever the type of engine, the particulate filter has evolved to a very high efficiency, trapping above 90% of soot with a wall flow filter. When sufficient soot has been deposited on the walls, the pressure drop increases across the particulate filter and an even higher soot trapping efficiency is achieved. It is common to measure pressure drop across a particulate filter through the use of a delta pressure sensor, used to predict soot loading. Typically, these predictions are made with models such as those disclosed by Konstandopoulos, et al. (SAE paper 2002-01-1015). The delta pressure reading is converted to a normalized pressure differential using equations set forth in the above referenced SAE paper and these are used to determine when the particulate filter trap needs to be regenerated in order to remove the soot in the trap.

The particulate filter, having a high efficiency, also traps ash, which comes from high ash lubricating oil, excessive oil consumption, and the use of high ash fuels, such as biodiesel. As ash gradually accumulates in the particulate filter, the delta pressure signal at a given soot load will be higher. This consequence is a result of ash occupying space in the inlet channels of the particulate filter, leaving less surface or volume for soot distribution providing an obstruction to gas flow that increases the pressure drop across the particulate filter.

Overall, ash accumulation is generally a slow process. Total exhaust system back pressure due to ash starts to become noticeable in the regeneration intervals generally above 2,500 hours of engine operation for engines having a power output of greater than 130 kilowatts (174 HP). For engines having lower than 130 kilowatts output, the ash effect can occur above 1,500 hours. In addition to the indication of more frequent regeneration of the particulate filter, the accumulation of ash affects the engine performance overall due to increasing back pressure. Without any compensation for ash loading, the time interval between regeneration starts to decrease, since the system typically determines whether regeneration should occur based on delta pressure. In addition to the ash loading having an effect on regeneration intervals, it also can affect the service life of the particulate filter, that is the point at which the filter needs to have accumulated ash removed therefrom.

What is needed in the art, therefore, is a method for reliably predicting the service life of a particulate filter in an internal combustion engine system.

SUMMARY

The present invention provides a method for determining the service life of a particulate filter receiving products of combustion from and filtering particles from an air breathing, fuel consuming combustion engine including the steps of determining the normalized current pressure differential across the particulate filter, determining the normalized pressure differential across the particulate filter for clean conditions, and subtracting the clean pressure differential across the particulate filter from the current pressure differential across the particulate filter and dividing by the time between regeneration to determine a current factor. A maximum factor is predetermined and compared to the current factor to determine service life of the particulate filter.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention and such exemplification is not to be construed as limiting the scope of the invention in any manner.

DETAILED DESCRIPTION

Figure 1:
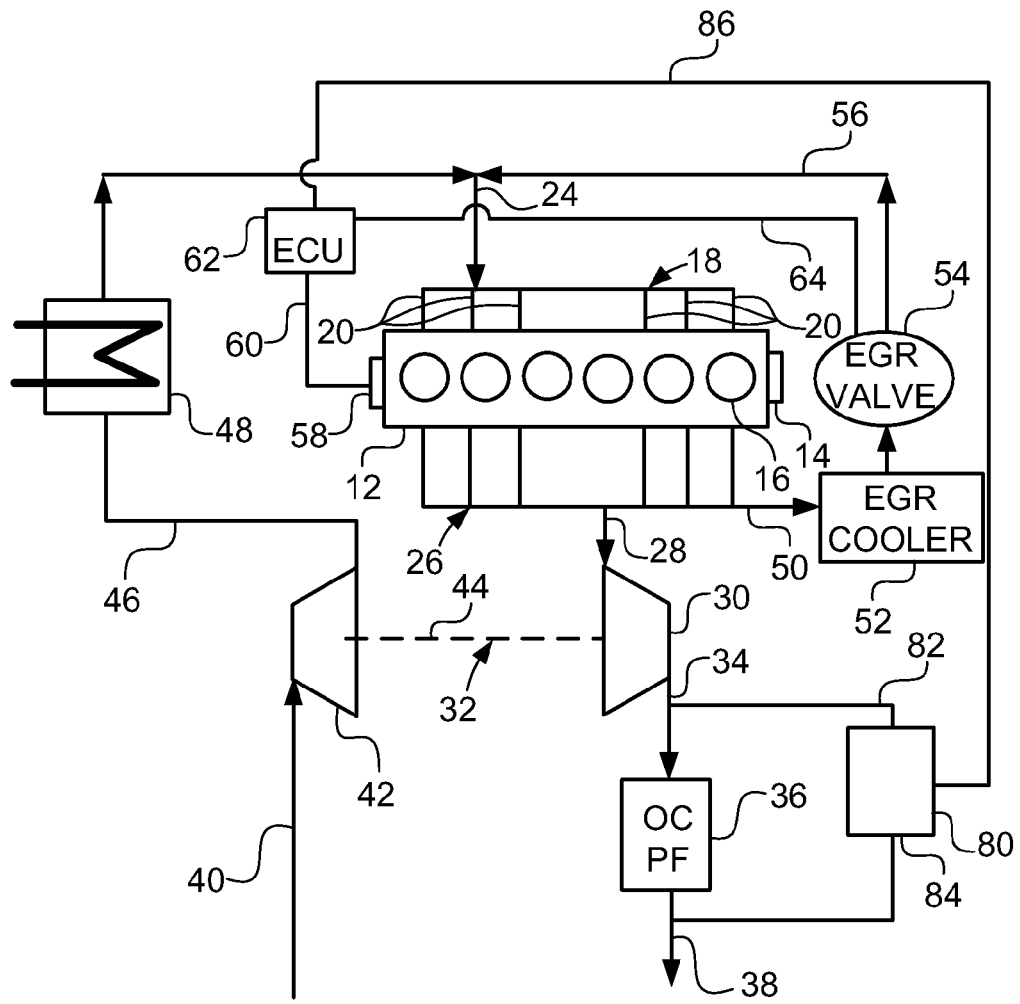
FIG. 1 is a schematic drawing of an internal combustion engine system embodying a method according to the present invention.

Referring now to the drawings, and more particularly to FIG. 1, there is shown an internal combustion engine power system including a multi-cylinder engine 12, having a plurality of cylinders in which pistons (not shown) are mounted for reciprocating movement and which connect by means of connecting rods to a crank shaft leading to an output shaft 14 producing useful work. The engine cylinders 16 receive air for combustion from an intake manifold 18 for compression and ignition with a source of fuel to be described later.

The combustion events cause power to be applied to the output shaft 14 and the products of combustion are discharged through an exhaust manifold 26 and exhaust line 28, typically through a turbine 30 of a turbocharger 32. From the turbine 30, the exhaust gasses pass to a particulate filter 36 and, from there, through appropriate exhaust line 38 to the ambient. Turbine 30 is connected to a shaft 44, which drives a compressor 42 that pressurizes air received from ambient air intake line 40 for discharge through line 46 and through an after cooler 48. After cooler 48 may take a number of forms, including air-to-air or liquid-to-air but the object of both is to cool the pressurized air to increase its density and, therefore, increase available power in the cylinders 16 of engine 12. The air output from after cooler 48 connects with a line 24 extending to intake manifold 18 for combustion air.

Engine 12 has a fuel system diagrammatically illustrated at 58 which supplies fuel in measured quantities and controlled times to the cylinders 16 of engine 12 for combustion. For a diesel form of engine 12, fuel system has a series of injectors that inject measured quantities of fuel into cylinders 16 at precise timing to cause combustion due to the heat of compression of the inlet air. Fuel system 58 receives sensor inputs from a number of engine operating parameters and is controlled via line or lines 60 from an electronic control unit 62 to control the fuel quantity and timing as appropriate for the duty cycle of engine 12.

In order to meet emission requirements, a line 50 is fluidly connected to the exhaust manifold 26, or other portion of the exhaust system, and leads preferably to an EGR cooler 52 and, from there, to an EGR valve 54, which controls discharge of a portion of the exhaust gasses via line 56 to intake line 24. In typical fashion, the EGR valve 54 is controlled by line 64 extending to ECU 62. The use of EGR enables the engine 12 to meet NOx emissions limits but it typically generates other emissions and, among those, are particulates, which are filtered by the particulate filter 36. Particulate filter 36 accumulates particulates and it thus becomes necessary to periodically regenerate the filter by manipulating engine variables to increase the temperature in line 34 leading to particulate filter 36 or to add additional heat in the form of heaters or hydrocarbon fuels to raise the temperature of the particulate filter sufficiently such that particles are burned off. Such triggering is provided by a delta pressure sensor 80, having a line 82 connected to line 34 upstream of the particulate filter and a line 84 connected to line 38 downstream of the particulate filter. The signal thus generated is fed via line 86 to ECU 62 in order to signal engine operating conditions are to be changed to begin a regeneration process.

As engine 12 operates over its service life, it reaches a point where ash accumulates within the filter and begins to affect the delta pressure reading to indicate a higher than expected pressure differential which, in turn, causes regeneration to occur more frequently and which ultimately could lead in harm to the particulate filter 36. In accordance with the present invention, the method described in FIG. 2 is employed to provide a realistic predictor of particulate filter service life.

Figure 2:
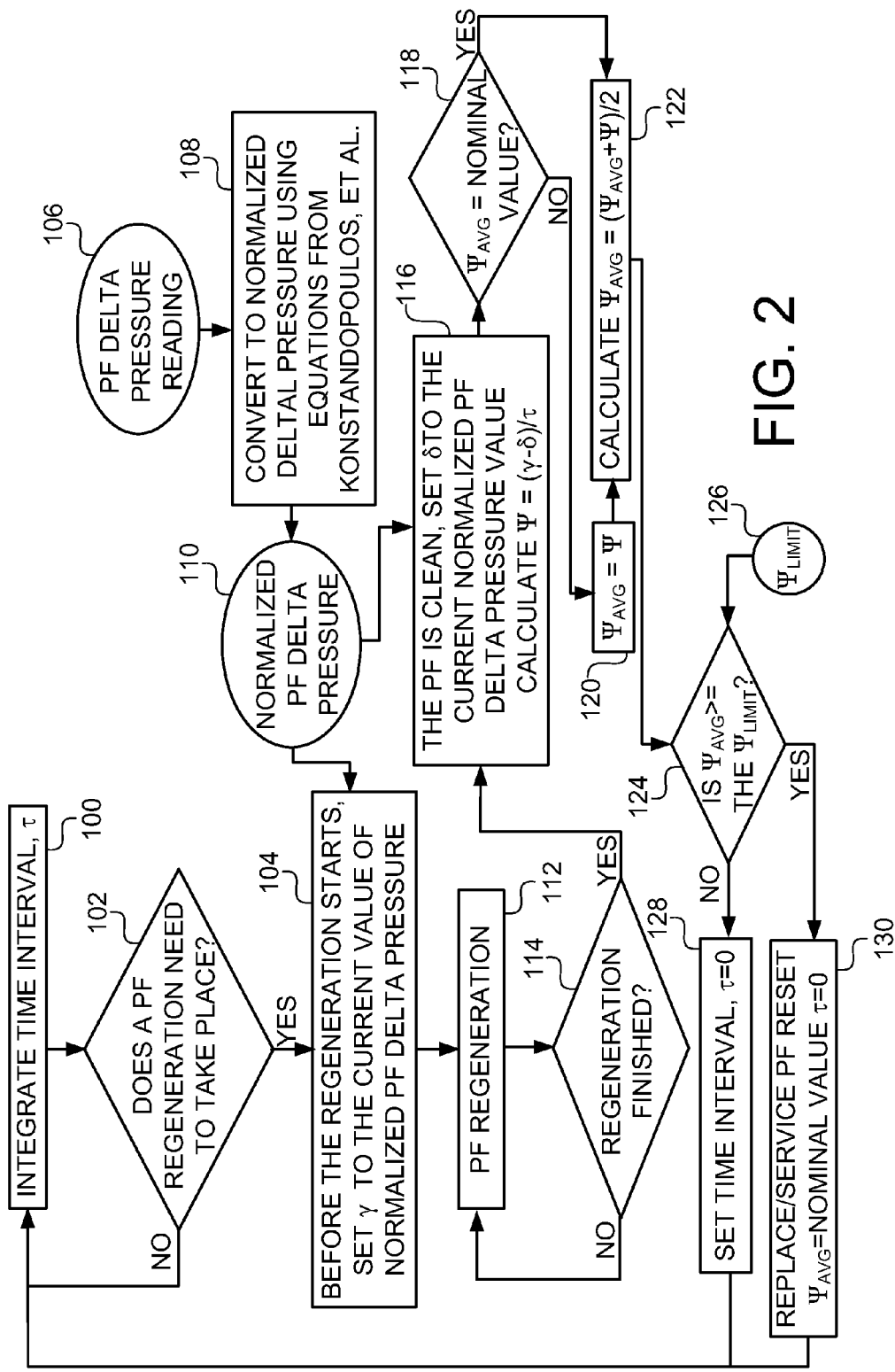
FIG. 2 is a block diagram showing the steps in a method according to one aspect of the present invention.

Referring to FIG. 2, a block diagram shows one aspect of the method embodying the present invention. In the method of FIG. 2, step 100 constitutes integrating the time interval $\tau$ between previous regenerations and step 102 indicates whether a regeneration needs to take place. If the time interval $\tau$ is an appropriate interval before the regeneration starts in step 104, the current normalized delta pressure $\gamma$ across particulate filter 36 would be set to the current value of normalized delta pressure. The delta pressure reading in step 106 is converted to normalized delta pressure in step 108 using equations from Konstandopoulos referred to above to provide a normalized particulate filter delta pressure $\gamma$. The equations of Konstandopoulos are hereby incorporated in herein their entirety.

In step 112, the particulate filter regeneration occurs and, in step 114, if regeneration is finished, step 116 provides a current normalized clean particulate filter delta pressure value and a factor $\Psi=(\gamma-\delta)/\tau$. In step 118, it is determined whether the factor $\Psi_{AVG}$ is preset/equal to a nominal value. If it is not, then, in step 120, the average factor $\Psi_{AVG}$ is set to be equal to $\Psi$ and step 122 proceeds to calculate the average between $\Psi$ and $\Psi_{AVG}$. If the factor $\Psi_{AVG}$ is preset/equal to the nominal value, then, in step 122, the average factor $\Psi_{AVG}$ is equal to $(\Psi_{AVG}+\Psi)/2$ to average the two. In step 124, it is determined whether $\Psi_{AVG}$ is equal to the $\Psi$ limit, which is provided empirically in step 126. If $\Psi$ is less than $\Psi$ limit, then the time interval $\tau$ in step 128 is reset to zero. If the factor $\Psi$ exceeds $\Psi$ limit from step 126, then, in step 130, the particulate filter 36 is replaced or serviced and the factor $\Psi_{AVG}$ is reset to the nominal value.

Figure 3:
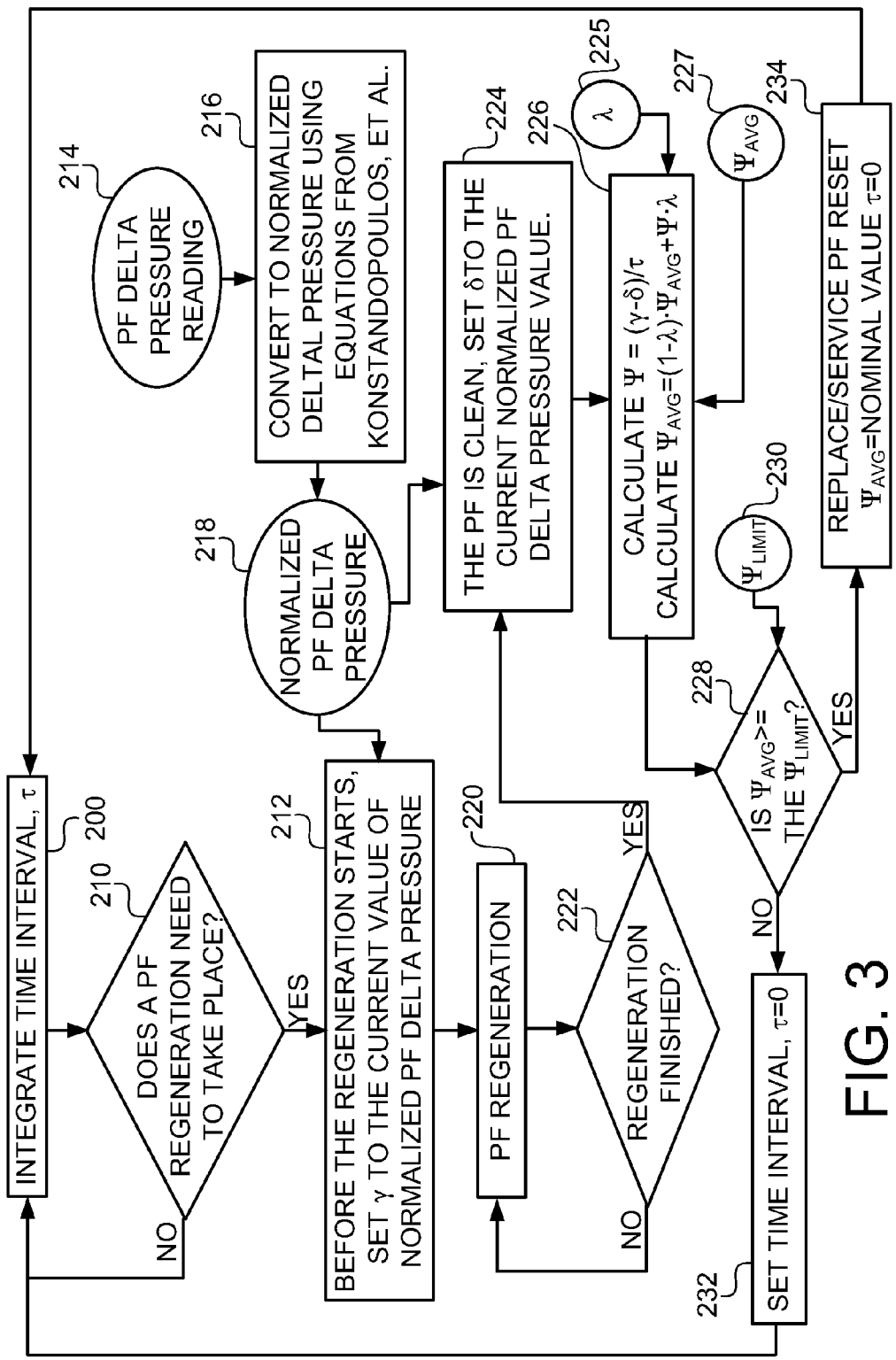
FIG. 3 is a block diagram of the steps employed in another aspect of the present invention.

In the method shown in FIG. 3, the step 200 of determining a time interval $\tau$ leads to a decision in step 210 as to whether a regeneration needs to take place. If the answer is yes, in step 212, the current normalized delta pressure $\gamma$ provided by a particulate filter 36 delta pressure reading in step 214 is converted to normalized delta pressure in 216 using the equations of Konstandopoulos to provide, in step 218, a current value of normalized delta pressure. At that point in step 220, regeneration of the particulate filter 36 may take place and, in step 222, if it is finished, in step 224, the normalized clean delta pressure $\delta$ in step 224 is set to the current normalized delta pressure across particulate filter 36. In step 226, a factor $\Psi$ is calculated using the maximum current normalized delta pressure $\gamma$ minus the clean delta pressure $\delta$ over the time between regeneration intervals $\tau$ and the average factor $\Psi_{AVG}$ is calculated using the equation one minus the weighing factor $\lambda$ times $\Psi_{AVG}$ plus $\Psi$ times a weighing factor $\lambda$. In step 225, weighing factor $\lambda$ is preselected. It can vary from 0-1 but a typical factor can be 0.1. In step 226, the exponentially weighted moving average is used to determine the factor $\Psi$ using $\Psi_{AVG}$ from step 227.

In step 228, the factor is compared to the limit set in 230. If the factor $\Psi$ is less than $\Psi$ limit, then the time interval in step 232 is set to zero. If the factor $\Psi_{AVG}$ is greater than or equal to the $\Psi$ limit in step 228, the particulate filter is replaced or serviced and the factor $\Psi_{AVG}$ is reset to a nominal value. The time interval $\tau$ is also reset to zero.

The advantage of the above methods is to take into account the accumulation of ash in the particulate filter 36 so as to make replacement or servicing of the particulate filter 36 at a time that prevents harm to the particulate filter 36 due to overly frequent regeneration.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A computer-implemented method comprising:

determining, by one or more computing devices, a normalized current pressure differential across a particulate filter at a current time;

regenerating the particulate filter to a clean condition after a determined time interval has elapsed, the determined time interval being measured from an installation of the particulate filter, or a prior regeneration of the particulate filter, to approximately the current time;

determining, by the one or more computing devices, a normalized clean pressure differential across said particulate filter for the clean condition;

determining, by the one or more computing devices, a pressure differential difference by, at least in part, subtracting the normalized clean pressure differential from the normalized current pressure differential;

determining, by the one or more computing devices, a current pressure drop factor by, at least in part, dividing the determined pressure differential difference by the determined time interval;

determining, by the one or more computing devices, an average pressure drop factor based upon, at least in part, the current pressure drop factor;

identifying, by the one or more computing devices, a maximum pressure drop factor;

comparing, by the one or more computing devices, the average pressure drop factor to the maximum pressure drop factor; and identifying, by the one or more computing devices, a need to replace or service the particulate filter based upon, at least in part, comparing the average pressure drop factor to the maximum pressure drop factor.

2. The method of claim 1, wherein the filter is configured to receive products of combustion from an air breathing, fuel consuming internal combustion engine, and to filter soot particles from the received products of combustion.

3. The method of claim 2, wherein the determined time interval is a predetermined time interval based upon, at least in part, one or more of a characteristic of the engine and a characteristic of the filter.

4. The method of claim 3, wherein the determined time interval is greater than 150 hours.

5. The method of claim 4, wherein the engine has a power output of lower than 130 kilowatts and the determined time interval is at least 1500 hours.

6. The method of claim 4, wherein the engine has a power output of greater than 130 kilowatts and the determined time interval represents at least 2500 hours of engine operation.

7. The method of claim 1 wherein the average pressure drop factor is determined based upon, at least in part, determining an exponentially weighted moving average.

* * * * *